United States Patent [19]

Murphy

[11] 4,031,670

[45] June 28, 1977

[54] ADJUSTABLE SHARPENER FOR SELF-SHARPENING FEED CHOPPING KNIVES

[76] Inventor: C. J. Murphy, Rte. 1, Abilene, Kans. 67410

[22] Filed: Dec. 29, 1975

[21] Appl. No.: 644,925

[52] U.S. Cl. .................................................. 51/250
[51] Int. Cl.² ........................................... B24B 3/36
[58] Field of Search ...................... 51/250; 56/250; 76/82.1

[56] References Cited

UNITED STATES PATENTS

| 1,047,814 | 12/1912 | Johansen | 51/250 |
| 1,888,285 | 11/1932 | Muir | 51/250 |
| 2,032,731 | 3/1936 | Wilson | 51/250 |
| 2,476,177 | 7/1949 | Bloom | 56/250 X |
| 3,059,384 | 10/1962 | McClellan | 51/250 |

Primary Examiner—Gary L. Smith
Assistant Examiner—Nicholas P. Godici
Attorney, Agent, or Firm—John H. Widdowson; Edwin H. Crabtree

[57] ABSTRACT

An improved adjustable sharpener for self-sharpening feed chopping knives. The sharpener provides a stone housing having a sharpening stone mounted therein for the sharpening of the edges of the knives mounted on a rotating cutter head. The stone is manually adjustable in a direction toward the axis of the cutter head. The stone is prevented from lateral movement by rigidly securing the length of the stone inside the stone housing. The sharpener is provided with a cutter bar for the more efficient cutting of the crop material and for protecting the stone from breakage.

7 Claims, 8 Drawing Figures

ADJUSTABLE SHARPENER FOR SELF-SHARPENING FEED CHOPPING KNIVES

BACKGROUND OF THE INVENTION

This invention relates generally to a tool sharpener and more particularly, but not by way of limitation, to a sharpener for sharpening feed chopping knives.

Heretofore, there have been various prior art sharpeners for feed chopping knives and lawnmower blades.

One type of sharpener includes a sharpening stone mounted in a housing. The housing is spring biased laterally for holding the stone in position for shapening the knives. This type of arrangement allows lateral movement of the stone when a foreign object becomes trapped between the stone and the knives. By allowing the stone to move laterally the elongated length of the stone is susceptible to breakage.

Another type of sharpener used in lawnmowers includes a sharpening stone having a spring biasing means for continuously applying tension on the stone against the cutter blades. By applying continuous tension on the cutting stone excessive wear is caused on the cutting blades and wear and breakage on the sharpening stone.

None of the prior art sharpeners disclose a sharpener for accurately sharpening and truing feed chopping knives and controlling the wear and breakage of the sharpening stone as herein described.

SUMMARY OF THE INVENTION

The improved adjustable sharpener continuously sharpens the feed chopping knives during the operation of the cutter head. The sharpener greatly reduces sharpening stone breakage by preventing lateral movement or rotation of the stone as the knives rotate thereby. Breakage of the stone and knives is further reduced by allowing the stone to move upward away from the axis of the cutter head should a foreign object become trapped between the edge of the knives and the sharpening stone.

Excessive wear of the stone and wear on the edges of the cutting knives is prevented by a manual adjustment which allows the sharpening stone to be held in adjustment and prevents the stone from being continuously biased against the edge of the knives. Because of the manual adjustment the sharpening stone is held securely in position allowing sharpening along the entire length of the edge of the knives and also truing of the cutter head. Also because the stone is held in adjustment not only are the knives sharpened but their edges can be finely honed for greater efficiency in cutting.

The subject invention includes an elongated cutter bar mounted adjacent the length of the sharpening stone for the more efficiently cutting of the crop material and protecting the sharpening stone from foreign objects being trapped between the knives and the sharpening stone or objects hitting the sides of the stone causing stone breakage.

The adjustable sharpener is mounted on a hinged shield covering an opening adjacent the cutter head. The shield provides easy access for maintaining the sharpener and changing the stone in the stone housing. The hinged shield and sharpener are readily adaptable to various types and makes of cutter heads and replace hinged lids mounted on the cutter head housing which are used for obtaining access to service the cutter head.

The adjustable sharpener includes a stone housing adjacent the length of the cutter head. An elongated sharpening stone is mounted in the housing and is laterally secured therein. A follower is disposed against the stone and attached to the housing by adjusting bolts. By adjusting the bolts the amount of travel of the follower and the stone can be determined. A leaf spring is disposed inside the housing and against the follower to maintain the follower and stone in adjustment. A cutter bar is disposed along one side of the follower and the stone.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
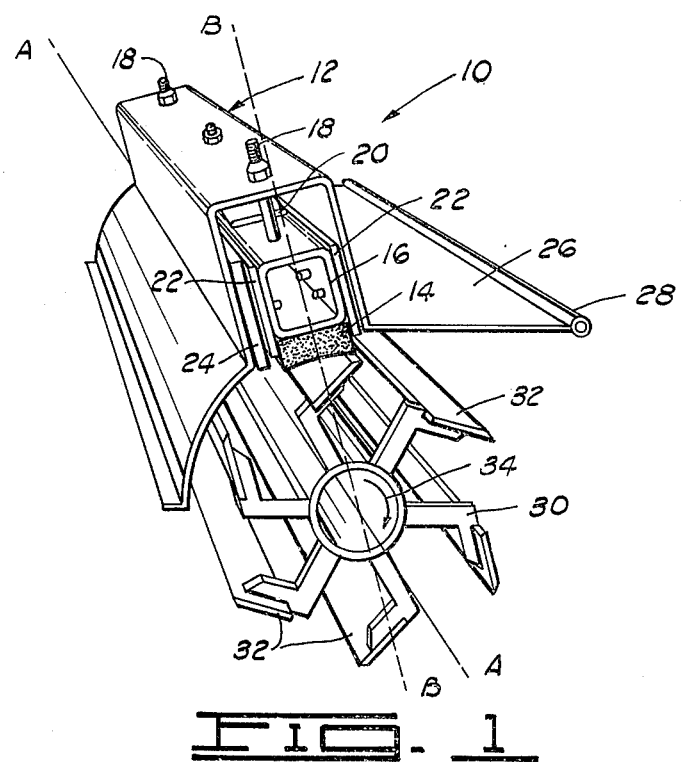
FIG. 1 is a perspective view of the improved adjustable sharpener disposed adjacent the cutter head.

In FIG. 1 the improved adjustable sharpener is designated by general reference numeral 10. The sharpener 10 includes a U-shaped stone housing 12, an elongated sharpening stone 14 mounted in the housing 12, an elongated follower 16 mounted in the housing 12 and disposed on top of the stone 14, threaded adjusting bolts 18 attached to the housing 12 and the follower 16, a leaf spring 20 attached to the housing 12 and biased against the top of the follower 16, holders 22 attached to the follower 16 for holding the stone 14 laterally in place and an elongated cutter bar 24 mounted between a side of the housing 12 and a side of one of the holders 22.

Figure 2:
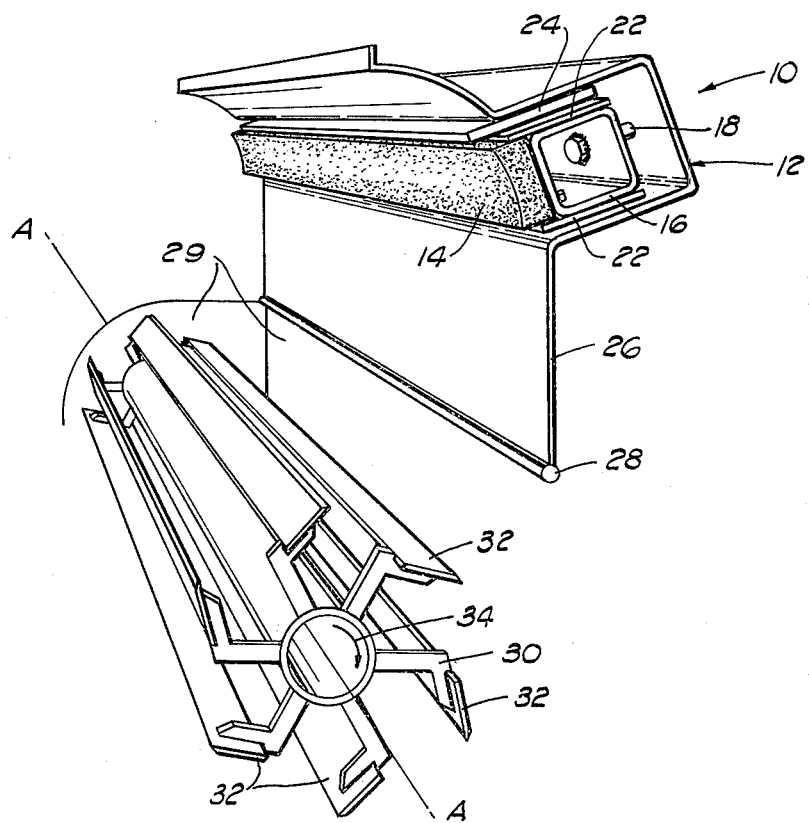
FIG. 2 is a perspective view of the sharpener raised above the cutter head for servicing either the sharpener or the cutter head.
Figure 3:
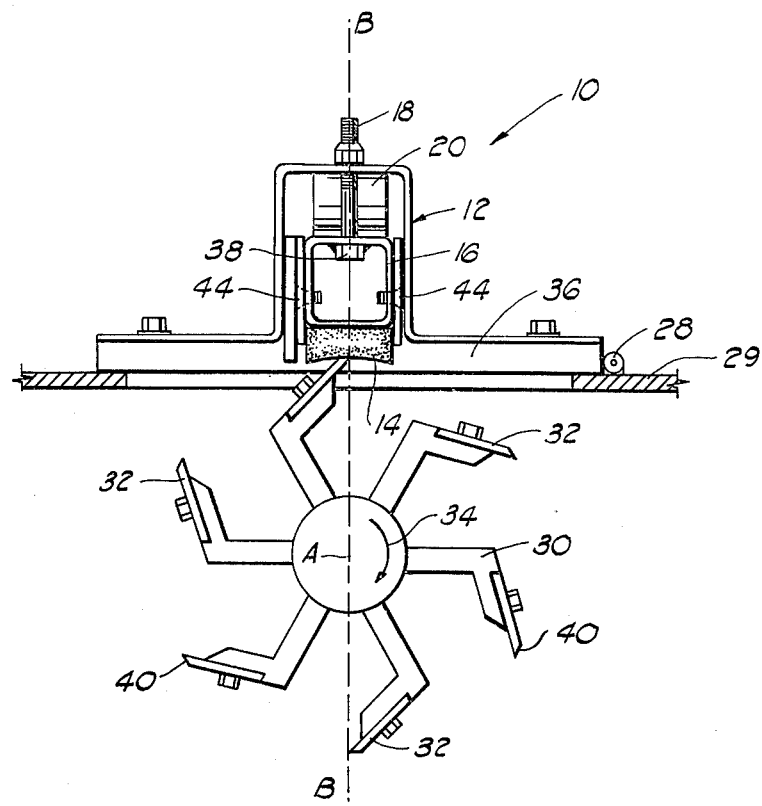
FIG. 3 is a side view of the sharpener and cutter head.

The housing 12 is integrally formed in a curved shield 26 which includes a hinge 28. The hinge 28 of the shield 26 is mounted to a cutter head housing 29. A portion of the housing 29 is shown in FIGS. 2 and 3. A cutter head 30 is rotatably mounted in the housing 29. The cutter head 30 includes feed chopping knives 32 which are used for cutting crops, forage, ensilage, or the like. The arrow 34 indicates the direction of rotation of the cutter head 30.

The sharpener 10 is adjusted inwardly toward the axis A—A of the cutter head and in a plane through the axis A—A and a line B—B. The line B—B is shown in dotted lines and is disposed through the center of the housing 12 and intersecting axis A—A. The plane formed by the axis A—A and the dotted line B—B intersects the center of the elongated lengths of the housing 12, the follower 16, and the stone 14.

In FIG. 2 the sharpener 10 and shield 26 are raised above the cutter head 30. This figure is shown to illustrate the adaptability of the sharpener 10 and how the sharpener 10 and shield 26 can be hingeably attached to an opening in the housing 29 of the cutter head 30. Through the use of the hinge 28 the shield 26 can be quickly raised for servicing the sharpener 10 such as the changing of the stone 14 or removing any foreign object that may be caught between or wrapped around the cutter head 30. Also any object trapped between the cutter bar 24, stone 14 and the knives 32 can be quickly removed.

In FIG. 3 the sharpener 10 is shown with the housing 12 integrally formed in a straight shield 36, rather than a curved shield 26 as shown in FIGS. 1 and 2. The straight shield 36 and curved shield 26 are shown to illustrate that the sharpener 10 is adaptable to different types and makes of equipment having a cutter head 30 for cutting crops. But it is important to note that the length of the sharpener 10 to be properly installed should be aligned with the axis A—A of the cutter head 30 and parallel thereto. In this view the axis of rotation of the cutter head 30 is shown as a point A. The plane in which the sharpener 10 is adjustable appears as a line through the dotted line B—B.

The sharpener 10 is manually adjusted by loosening the bolts 18. When the bolts 18 are loosened the leaf spring 20 biases the follower 16 against the head 38 of the bolt 18. In turn the stone 14 which is disposed against the follower is urged toward the axis A—A of the cutter head 30 and along the line B—B. The length of the stone 14 is adjusted until it contacts the cutting edge 40 of the knives 32.

Figure 4:
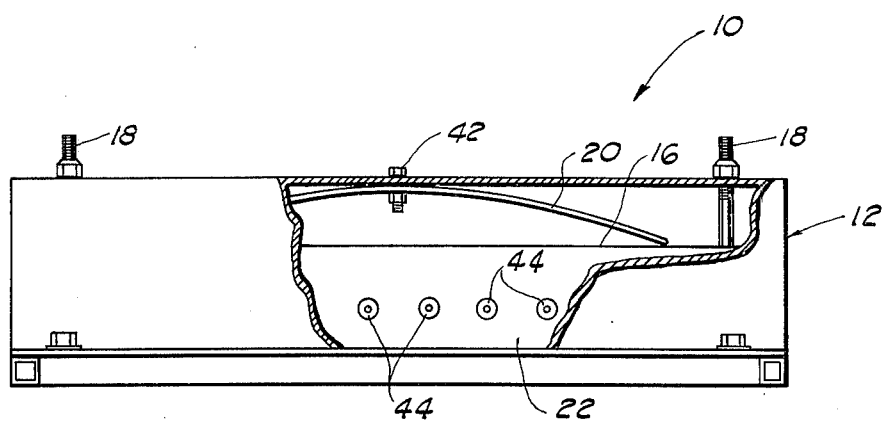
FIG. 4 is a front view of the sharpener.

In FIG. 4 a cut away of the housing 12 is shown to illustrate the leaf spring 20 which is attached by a bolt 42 to the top of the housing 12. In this figure the leaf spring 20 can be seen biasing the follower 16 downward. The holders 22 include threaded screws 44 for tightening the holders 22 against the sides of the follower 16 and against the sides of the stone 14. By securing the elongated length of the stone 14 between the holders 22, the stone is prevented from moving laterally or rotating in the housing 12 while the edges 40 of the knives 32 are continuously sharpened.

Figure 5:
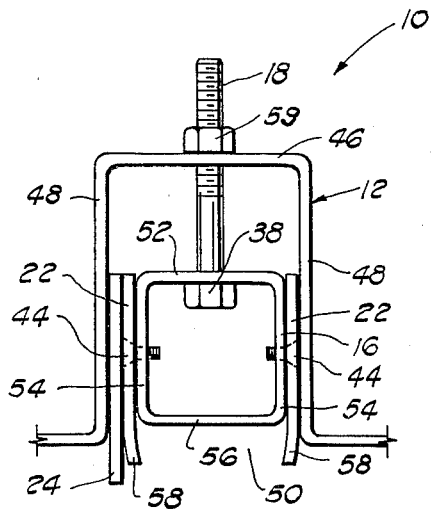
FIG. 5 and FIG. 6 are side views of the stone housing.

In FIG. 5 a detailed side view of the housing 12 is shown. The housing 12 includes a top portion 46, side portions 48, and an open portion 50. The follower 16 is hollow and is shown having a top portion 52, side portions 54, and a bottom portion 56. The top portion 52 of the follower 16 is attached to the top portion 46 of the housing 12 by the threaded bolt 18. Disposed between the side portions 48 of the housing 12 and the side portions 54 of the follower 16 are the holders 22. A bottom portion 58 of the holders 22 is flared inwardly. Disposed on one side of the housing 12 and positioned between the side portion 48 of the housing 12 and the holder 22 is the elongated cutter bar 24. The cutter bar 24 is normally disposed on the lead side of the housing 12 as the knives 32 rotate toward the stone 14.

Figure 6:
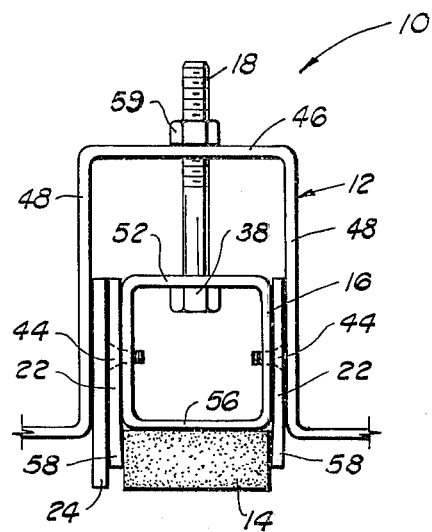

FIG. 6 illustrates how the elongated stone 14 is disposed in the open portion 50 of the housing 12 and held against the bottom portion 56 of the follower 16. By loosening the threaded screws 44 the stone 14 is inserted between the holders 22 and against the bottom portion 56 of the follower. As the threaded screws 44 are tightened the flared bottom portion 58 of the holders 22 are compressed against the sides of the stone 14 thereby rigidly securing the stone 14 along its elongated length.

Figure 7:
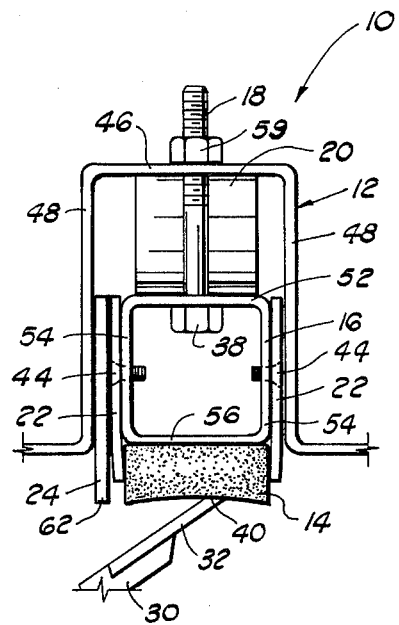
FIGS. 7 and 8 are side views of the stone housing illustrating the manual adjustment of the sharpening stone.
Figure 8:
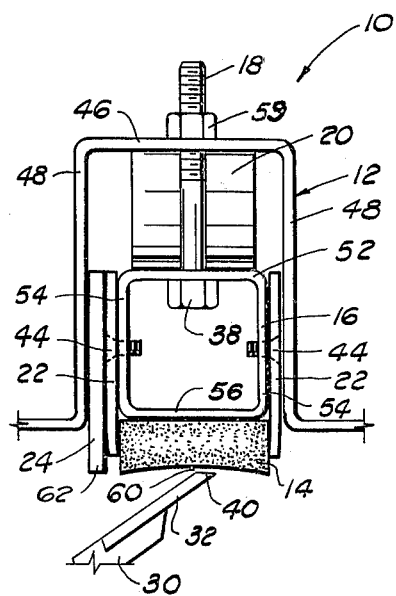

In FIG. 7 and FIG. 8 the manual adjustment of the sharpener 10 is illustrated to show how the stone 14 is prevented from being continuously biased against the edge 40 of the knives 32. In FIG. 7 by loosening a nut 59 on the threaded bolt 18, the stone 14 can be adjusted against the edge 40 of the knives 32. The stone 14 is held in adjustment by the leaf spring 20 which continuously biases the follower 16 against the head 38 of the adjusting bolt 18. The follower 16 is secured to the top of the stone 14 by the holders 22. Should a foreign object become trapped between the edge 40 of the knives 32 and the stone 14, the tension placed on the top portion 52 of the follower 16 by the leaf spring 20 will be overcome and the stone 14 and follower 16 will move upward in the housing 12 thereby allowing the foreign object to pass between the stone 14 and knife 32. The upward movement is provided due to the hollow follower 16 which allows the top portion 52 to travel along the length of the adjusting bolts 18. Downward movement of the hollow follower 16 is prevented by the bolt head 38 riding against the top portions 52 of the follower 16.

In FIG. 8 the sharpener 10 is shown ready for additional adjustment as indicated by a gap 60 between the stone 14 and the cutting edge 40. By manually controlling the adjustment of the stone 14 against the cutting edge 40, the knives are continuously sharpened and honed and the cutter head 30 is trued.

An edge portion 62 of the cutter bar 24 is disposed adjacent the cutting edge 40 of the knives 32. The cutting edge 40 rotates pass the edge portion 62 of the cutter bar 24 as knives 32 approach the sharpening stone 14. The cutting bar 24, while it could act as a primary cutting bar for the cutter head 30, it normally would act as a secondary cutter bar to a primary bar which would be mounted in the cutter head housing 29. The primary cutter bar is not shown in the above figures. The cutter bar 24 provides the additional advantages of providing more efficient cutting of the crop material and also acts to protect the stone 14 from breakage by preventing foreign objects from hitting against the exposed side of the stone 14 and becoming trapped between the knives 32 and the stone 14.

Changes may be made in the construction and arrangement of the parts or elements of the embodiments as disclosed herein without departing from the spirit or scope of the invention as defined in the following claims.

I claim:

1. An adjustable sharpener for self-sharpening feed chopping knives, the knives mounted on a rotating cutter head, the knives used in cutting crops, forage, ensilage, or the like, the sharpener comprising:

a stone housing disposed adjacent the length of the cutter head;

an elongated sharpening stone mounted in said housing, said stone disposed adjacent the length of the cutting edge of the knives and tangent thereto, said stone laterally secured in said housing to prevent lateral movement of said stone as the cutting edges of the knives rotate thereby;

adjusting means attached to said housing for manually adjusting said stone in a direction toward the axis of the cutter head;

biasing means attached to said housing and disposed against said adjusting means for biasing said adjusting means so that said stone is kept in adjustment; and an elongated cutter bar mounted in said housing and disposed adjacent said stone, an edge of said cutter bar disposed adjacent the length of the cutting edge of the knives and tangent thereto;

said adjusting means and said biasing means allowing movement of said stone in a direction away from the axis of the cutter head when a foreign object becomes trapped between said stone and the cutting edge of the knives.

2. The sharpener as described in claim 1 wherein, said stone housing is integrally formed in a hinged shield, said shield mounted on a housing containing the rotating cutter head.

3. The sharpener as described in claim 1 wherein, said adjusting means includes an elongated follower disposed against said stone and threaded bolts attached to said stone housing and said follower, said bolts threadably adjusting the travel of said follower and said stone in said housing.

4. The sharpener as described in claim 3 wherein, said biasing means includes a leaf spring attached to said stone housing and disposed between said housing and said follower for biasing said follower against the ends of said bolts so that said follower holds said stone in proper adjustment.

5. An adjustable sharpener for self-sharpening feed chopping knives, the knives mounted on a rotating cutter head, the knives used in cutting crops, forage, ensilage, or the like, the sharpener comprising:

a U-shaped stone housing having a top portion, side portions and an open portion, the open portion of said housing disposed adjacent the length of the knive reel;

an elongated sharpening stone mounted in said housing said stone having a top portion, side portions, and a bottom portion extending outwardly from said housing and disposed adjacent the length of the cutting edge of the knives and tangent thereto;

an elongated follower mounted in said housing, said follower having a top portion, side portions, and a bottom portion, the bottom portion of said follower disposed against the top portion of said stone;

threaded bolts attached to the top portion of said stone housing and the top portion of said follower for threadably adjusting the travel of said follower and said stone in said stone housing and in a direction toward the axis of the cutter head;

a leaf spring attached to the top portion of said stone housing and mounted between the top portion of said housing and the top portion of said follower for biasing said follower against the ends of said bolts so that said follower holds said stone in proper adjustment; and elongated holders disposed between the side portions of said housing and the side portions of said follower and said stone, said holders holding said stone in compression to prevent lateral movement of said stone as the cutting edge of the knives contact the bottom portion of said stone;

said follower, said adjusting bolts, and said leaf spring allowing movement of said stone in a direction away from the axis of the cutter head when a foreign object becomes trapped between said stone and the edge of the knife.

6. The sharpener as described in claim 5 including an elongated cutter bar having a top portion, side portions, and a bottom portion, the side portions of said cutter bar mounted between the side of said housing and the side of one of said holders, the bottom portion of said cutter bar disposed adjacent the length of the cutting edge of the knives and tangent thereto.

7. The sharpener as described in claim 5 wherein, said stone housing is integrally formed in a hinged shield, said shield mounted on a housing containing the rotating cutter head.

* * * * *